Oct. 30, 1923.
T. H. SCHEFFER ET AL
1,472,683
BEAVER TRAP
Filed Feb. 5, 1923
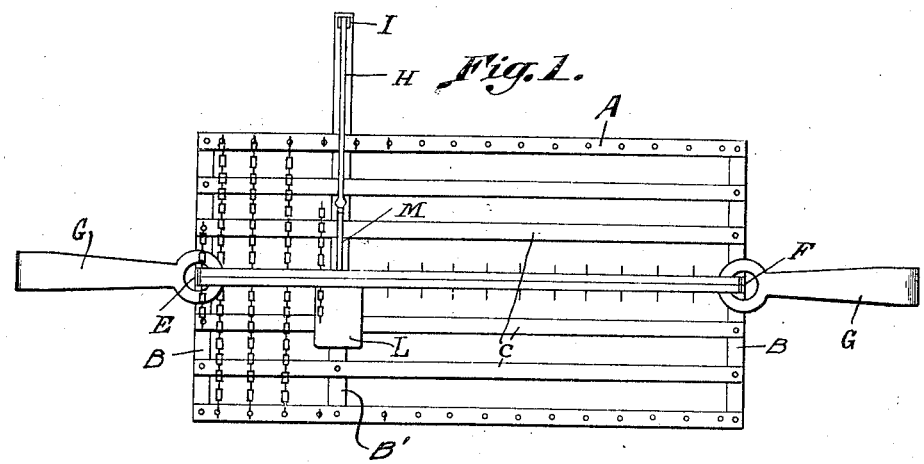
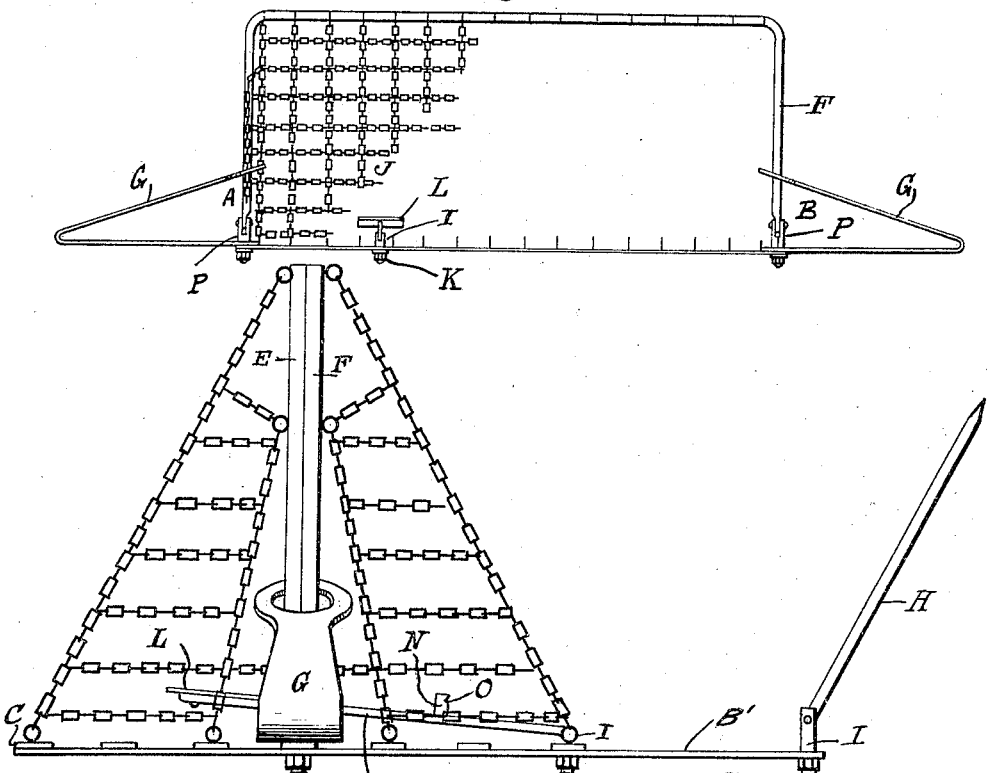
Joint Inventors.
Theodore H. Scheffer
Leo K. Couch
By R. W. Williams
Their Attorney.

Patented Oct. 30, 1923.

1,472,683

UNITED STATES PATENT OFFICE.

THEODORE H. SCHEFFER, OF PUYALLUP, AND LEO K. COUCH, OF OLYMPIA, WASHINGTON, ASSIGNORS TO ASSISTANT SECRETARY OF AGRICULTURE OF UNITED STATES OF AMERICA.

BEAVER TRAP.

Application filed February 5, 1923. Serial No. 617,158.

(FILED UNDER THE ACT OF MARCH 3, 1883, 22 STAT. L., 625.)

*To all whom it may concern:*

Be it known that THEODORE H. SCHEFFER and LEO K. COUCH, citizens of the United States of America, and employees of the United States Department of Agriculture, residing at Puyallup, Washington, and Olympia, Washington, respectively, have invented new and useful Improvements in Beaver Traps, of which the following is a specification.

This application is made under the act of March 3, 1883, chapter 143 (22 Stat. 625) and the invention herein described and claimed may be used by the Government of the United States or any of its officers or employees in the prosecution of work for the Government, or by any other person in the United States without payment to us of any royalty thereon.

The invention is a trap designed solely for catching beaver alive and uninjured. Plainly the efficiency of any trap depends upon its being so constructed as to adapt itself to the habits of the animal it is designed to capture. This invention conforms to such requirements in that it can be set under water, where it will not excite the beaver's suspicions, and will be sprung by the animal when following the course of its ordinary activities.

The object of the invention is to provide a beaver trap that will possess the requisite efficiency and, at the same time, will take the animals alive and uninjured, so that they may be removed from certain locations, especially where they are proving troublesome, and may be then used to stock a new or depleted range. As far as the inventors' knowledge goes, no other trap is adapted to this purpose. The trap is modeled somewhat on the lines of the regular double-spring steel trap, but is much larger and the jaws, instead of gripping the beaver by the leg, meet above the animal and enclose it in a purse of chain-mesh or other netting of metal construction.

The invention is shown in the accompanying drawing, which consists of three figures:

Fig. 1 is a top view of the trap sprung.

Fig. 2 is a side view of the trap sprung.

Fig. 3 shows an end view of the trap, sprung, without indicating that the chain-mesh netting must be loose so as to belly out somewhat to accommodate the imprisoned beaver.

Referring to the drawing, it will be seen that the trap has a base with transverse end bars B and longitudinal grid or grating bars C. At the two ends of the base, in the center, are hinged to posts P the rectangular jaws E and F that serve to close the pocket within the chain-mesh netting. These jaws are about fifteen inches high, above the base, and are actuated by No. 5 steel trap spring G. The trigger mechanism, consisting of a lever arm H hinged to post I at the outer end of an extension of one of the transverse bars B', a trigger arm M hinged to post K with the lever arm H engaging the trigger arm at the notch O in post N, and a trigger pan L at the free end of trigger arm M is attached to the base at about one fourth the distance from one hinge of the jaws to the other hinge. Parts of the chain-mesh netting are shown at J. It is constructed of metal throughout.

In setting the trap the two springs G are depressed until the hinged jaws E and F lie flat upon the basal framework. One of the jaws is held in this position by the lever-arm H hinged to post I of the trigger mechanism; the other, as in the ordinary steel trap, is free. The trap is sprung when the beaver by its tread or weight upon the trigger-pan L depresses the latter so as to release the engagement of the trigger-arm M hinged at post K with the lever-arm H at the notch O in the post N.

Having thus described our invention, what we claim as new, and desire to secure by Letters Patent, is—

A trap comprising a substantially rectangular base member composed of cross-bar grating, posts attached to opposite ends of said base, a pair of U-shaped jaws pivotally mounted on said posts, springs for actuating said jaws, trigger means attached to the base near one end thereof and adapted to releasably hold said jaws in set position, and a flexible netting attached to said jaws and to the edges of said base for enclosing the area above said base when the jaws are moved to closed position.

In witness whereof we hereunto set our hands and affix our seals this 5th day of October, A. D. 1922.

THEODORE H. SCHEFFER. [L. S.]
LEO K. COUCH. [L. S.]

Witnesses:
 GEO. W. EDGERTON,
 MELVA EDGERTON.